United States Patent
Lai

(10) Patent No.: US 9,707,626 B2
(45) Date of Patent: Jul. 18, 2017

(54) HOLE SAW ASSEMBLY

(71) Applicant: ROTE MATE INDUSTRY CO., LTD., Taichung (TW)

(72) Inventor: Ying-Tsung Lai, Taichung (TW)

(73) Assignee: ROTE MATE INDUSTRY CO., LTD., Taichung (TW)

( * ) Notice: Subject to any disclaimer, the term of this patent is extended or adjusted under 35 U.S.C. 154(b) by 158 days.

(21) Appl. No.: 14/520,357

(22) Filed: Oct. 22, 2014

(65) Prior Publication Data

US 2016/0114410 A1     Apr. 28, 2016

(51) Int. Cl.
*B23B 51/04* (2006.01)

(52) U.S. Cl.
CPC ...... *B23B 51/0473* (2013.01); *B23B 51/0426* (2013.01); *Y10T 279/17752* (2015.01); *Y10T 408/895* (2015.01)

(58) Field of Classification Search
CPC ............ B23B 51/0406; B23B 51/0473; B23B 31/071; B23B 2251/603; B23B 2251/606; Y10T 408/895; Y10T 408/8957; Y10T 279/17752

See application file for complete search history.

(56) References Cited

U.S. PATENT DOCUMENTS

| | | | | |
|---|---|---|---|---|
| 5,013,194 A | * | 5/1991 | Wienhold | B23B 31/1071 279/22 |
| 5,188,378 A | * | 2/1993 | Erlenkeuser | B25B 23/0035 279/22 |
| 6,270,085 B1 | * | 8/2001 | Chen | B25B 15/001 279/155 |
| 6,325,393 B1 | * | 12/2001 | Chen | B25B 15/001 279/155 |
| 6,341,925 B1 | * | 1/2002 | Despres | B23B 51/0453 408/204 |
| 6,623,220 B2 | * | 9/2003 | Nuss | B23B 31/1071 279/75 |
| 6,641,338 B2 | * | 11/2003 | Despres | B23B 51/0453 408/204 |
| 6,874,791 B2 | * | 4/2005 | Chen | B23B 31/1071 279/14 |

(Continued)

FOREIGN PATENT DOCUMENTS

| | | | | |
|---|---|---|---|---|
| DE | EP 2502693 A1 | * | 9/2012 | ......... B23B 31/1071 |
| EP | 1462198 A1 | * | 9/2004 | ......... B23B 31/1071 |
| JP | 2002137111 A | * | 5/2002 | ............. B23B 51/00 |

*Primary Examiner* — Eric A Gates
*Assistant Examiner* — Donte Brown
(74) *Attorney, Agent, or Firm* — Raymond Y. Chan; David and Raymond Patent Firm

(57) ABSTRACT

A hole saw assembly is revealed. The hole saw assembly is a hole saw with a quick change drill rod. The hole saw assembly includes a quick release device and the drill rod, both arranged at the hole saw. The drill rod is inserted through the quick release device and the quick release device is for fastening and releasing a drill head of the drill rod. Thereby the drill rod is fitted over the quick release device and users can fasten and release the drill rod quickly. Users can also quickly mount a shank of the drill rod quickly into the hole saw. The drill rod is fast slid out of the quick release device for replacement of a new drill rod. Then the shank is locked on the hole saw so that the shank and the hole saw can rotate synchronously.

20 Claims, 6 Drawing Sheets

(56) References Cited

U.S. PATENT DOCUMENTS

| | | | |
|---|---|---|---|
| 7,112,016 B2 | 9/2006 | Nordlin | |
| 7,824,137 B2* | 11/2010 | Vasudeva | B23B 31/008 206/379 |
| 8,113,748 B2* | 2/2012 | Werner | B23B 51/0453 408/204 |
| 8,157,021 B2* | 4/2012 | Chen | B23B 31/1071 173/29 |
| 8,328,474 B2* | 12/2012 | Pangerc | B23B 51/0473 408/1 R |
| 8,366,356 B2* | 2/2013 | Novak | B23B 51/0473 408/204 |
| 9,248,513 B2* | 2/2016 | Lai | B23B 31/1071 |
| 2005/0025592 A1* | 2/2005 | Cantlon | B23B 51/0473 408/204 |

* cited by examiner

HOLE SAW ASSEMBLY

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a hole saw assembly, especially to a hole saw assembly that includes a drill rod able to be mounted in and released from a hole saw quickly. The drill rod is generally fixed in an axial hole of the hole saw and is applied to hole saws with different diameters used as a shaft for positioning. Thus the hole saw will not have offset during rotation.

Description of Related Arts

In a conventional hole saw assembly, a drill rod can be quickly changed from the hole saw by a quick release device. The design of most of the quick release devices is for hole saws with larger diameter (such as hole saws with the diameter larger than 30 mm). For example, refer to U.S. Pat. No. 8,328,474, a quick change arbor, a hole cutter and a method suitable for hole saws with high torsion and large diameter are revealed. A hole cutter 12 includes an end plate 14. A drive shank 24 includes a body portion 26 with flats 25. The flats 25 are fastened on the end plate 14 while the pilot bit 64 is arranged at the drive shank 24. The body portion 26 is assembled with a collar 50 to form the quick change pilot bit 64. The quick change device is connected to the drive shank 24 and is having drive pins 36 set on the end plate 14 and driven into the corresponding drive pin apertures 18. The hole cutter 12 uses the drive shank 24 as a main transmission shaft. However, such structure is unable to be applied to hole saws with diameter smaller than 30 mm. This is due to that the width of the contact surface of the hole saws with the diameter smaller than 30 mm is unable to be assembled with the drive pins 36.

Refer to Canadian Pat. No. 2283453, an extractor is revealed. The extractor is applied to hole saws with small diameter. An adaptor is axially movable along a drill rod so as to remove debris attached on a hole saw and the drill rod. The drill rod is unable to be released from the adaptor. When the drill rod gets damaged, the drill rod and the adaptor should be replaced together. The adaptor is axially moved and then a head part of the drill rod is positioned by radial rotation. The adaptor is against and locked by a spring. After being used for a period of time, the spring may undergo elastic fatigue and the adaptor is unable to be locked and positioned on the position required. This results in that the head part of the drill rod is unable to be positioned and moved axially. This is dangerous for the users during the operation because the head part may be biased and get broken. Thus the drill rod is unable to be used as a positioning shaft of the hole saw.

For overcoming shortcomings of the conventional devices, reducing offset of the drill rod and quick change of the drill head from the hole saw, there is a need to provide a novel hole saw assembly that includes a quick release device designed for hole saws with diameter no more than 30 mm.

SUMMARY OF THE PRESENT INVENTION

Therefore it is a primary object of the present invention to provide a hole saw assembly with a quick change drill rod that includes a hole saw, a quick release device and a drill rod. The quick release device and the drill rod are disposed on the hole saw. The diameter of the hole saw is no more than 30 mm. The hole saw consists of an end surface and an opening. The opening is circular and the end surface is arranged with a threaded hole. The drill rod including a drill head and a shank is assembled with the quick release device. The shank is extended to form the drill head and a circular groove is disposed on the shank.

The quick release device is composed of a ring, a sleeve and a drive body. The ring is composed of a first end and a second end. The first end has a flange while the second end has a hexagonal hole. The sleeve has an extension portion that is extended to form a first connection portion. The sleeve also includes an axial hole that is extended axially from the extension portion to the first connection portion. The drive body includes a second connection portion. The second connection portion is axially extended to form a stopping portion while the stopping portion is extended axially to form a hexagonal portion. The axial extension of the hexagonal portion forms a threaded portion. The drive body further includes an assembly hole that is axially extended from the second connection portion to the threaded portion. The second connection portion is arranged with at least one socket and a spring is fitted over the hexagonal portion.

The second connection portion is mounted into the first connection portion and the stopping portion is against the edge of the first connection portion. The sleeve is assembled with the drive body first and then is mounted into the ring. The threaded portion is extended from the ring and the flange of the ring is around the extension portion of the sleeve. Thereby the quick release device is formed.

The quick release device is threaded into the hole saw and the drill rod 5 is directly slid into and assembled with the quick release device. The quick release device has a structure for releasing and locking the drill head. Thereby the drill rod is fitted into the quick release device and users can fasten and release the drill rod quickly. Users can also quickly mount the shank quickly into the hole saw. The drill rod is fast slid out of the quick release device for replacement of a new drill rod. Then the shank is locked on the hole saw so as to be rotated synchronously with the hole saw.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 1-1 is a schematic drawing showing a second end of a ring of an embodiment according to the present invention;

DETAILED DESCRIPTION OF THE PREFERRED EMBODIMENT

Please refer to following embodiments for details, features and effects of the present invention.

Figure 1:
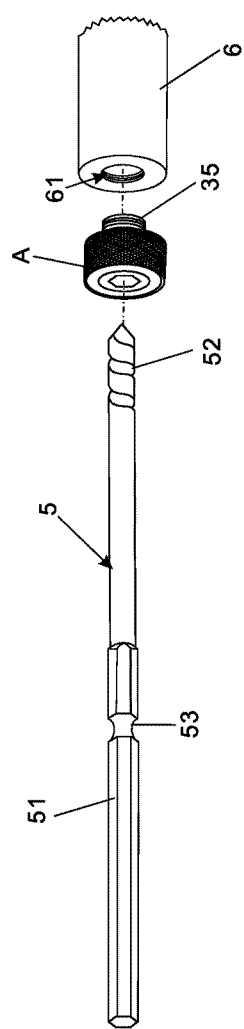
FIG. 1 is an explosive view of an embodiment according to the present invention.
Figures 1, 2:
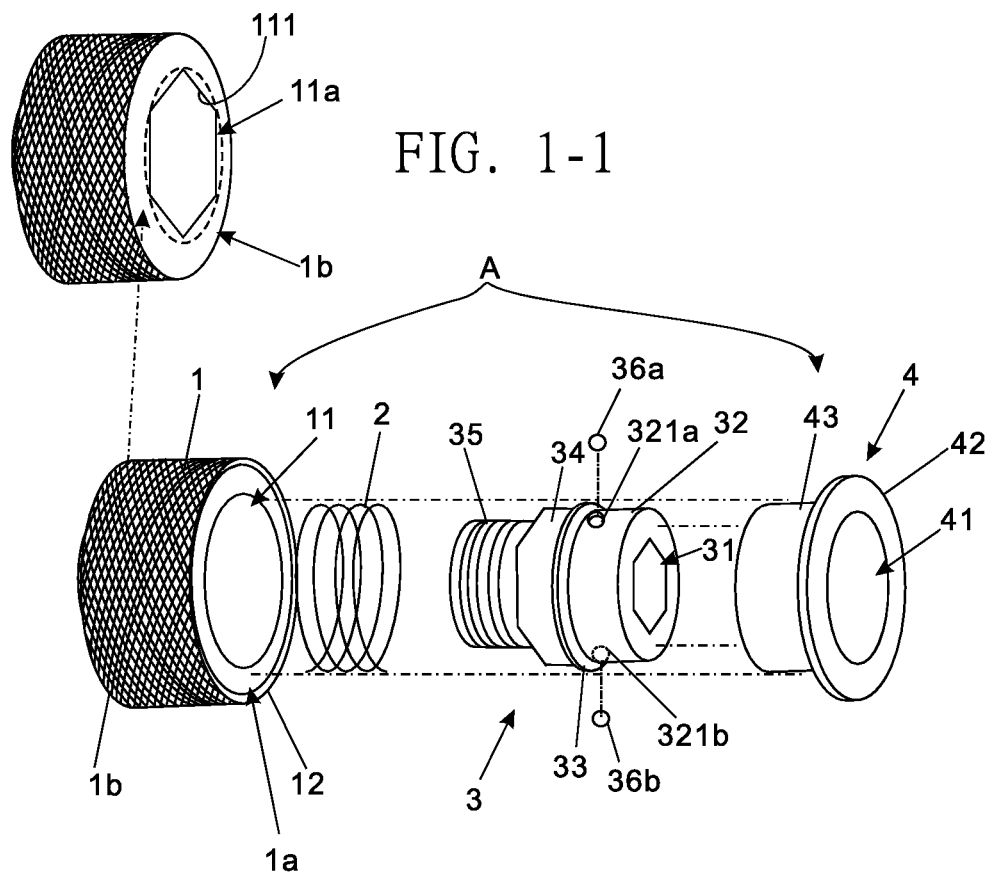
FIG. 2 is an explosive view of a quick release device of an embodiment according to the present invention.
Figure 3:
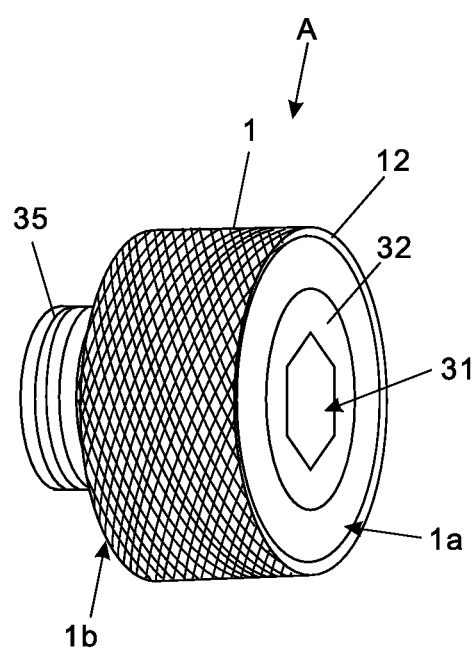
FIG. 3 is a perspective view of a quick release device of an embodiment according to the present invention.

A hole saw assembly of the present invention is a hole saw 6 with a quick change drill rod 5. Refer to FIG. 1, FIG. 2 and FIG. 3, the hole saw assembly includes the hole saw 6, a quick release device A and the drill rod 5. Both the quick release device A and the drill rod 5 are assembled with the hole saw 6. The hole saw 6 includes an end surface and an open end. The open end is a circular opening while the end surface is disposed with a threaded hole 61. The drill rod 5 is assembled with the quick release device A and is having a drill head 52 and a shank 51. The shank 51 is a hexagonal prism and is extended axially to form the drill head 52. A circular groove 53 is arranged at the shank 51.

As shown in FIG. 2, the quick release device A consists of a ring 1, a sleeve 4 and a drive body 3. The ring 1 is composed of a mounting hole 11, a first end 1a and a second end 1b. The mounting hole 11 is a circular hole penetrating the ring 1. The mounting hole 11 is extended to the second end 1b and formed a hexagonal hole 11a at the second end 1b, as shown in FIG. 1-1. Thereby the second end 1b forms a stopping part 111. The hexagonal hole 11a is a bit smaller than the mounting hole 11 so that the second end 1b becomes the stopping part 111. The first end 1a has a flange 12. The sleeve 4 has an axial hole 41, an extension portion 42, and a first connection portion 43. The extension portion 42 is extended to form the first connection portion 43 while the axial hole 41 is extended axially from the extension portion 42 to the first connection portion 43. The drive body 3 includes an assembly hole 31, a second connection portion 32, a stopping portion 33, a hexagonal portion 34 and a threaded portion 35. The stopping portion 33 is formed by axial extension of the second connection portion 32 while the stopping portion 33 is extended axially to form the hexagonal portion 34 and the hexagonal portion 34 is extended axially to form the threaded portion 35. The assembly hole 31 is hexagonal and is axially extended from the second connection portion 32 to the threaded portion 35, penetrating the drive body 3.

The second connection portion 32 is disposed with at least one socket 321a, 321b. Each of the sockets 321a, 321b needs to fit a bead 36a, 36b. A spring 2 is fitted over the hexagonal portion 34 and the second connection portion 32 is mounted into the axial hole 41 of the first connection portion 43. The stopping portion 33 is against the edge of the first connection portion 43.

The sleeve 4 is assembled with the drive body 3 first and then is mounted into the mounting hole 11 of the ring 1. The extension portion 42 is against the edge of the first end 1a. The threaded portion 35 is extended from the second end 1b of the ring 1 while the hexagonal portion 34 is fitted in the hexagonal hole 11a of the ring 1. The flange 12 of the ring 1 is around the outer diameter of the extension portion 42 of the sleeve 4. Thus the ring 1 can be axially moved within a certain distance around the outer diameter of the drive body 3 and turned back to the original position. Therefore the assembly of the quick release device A is completed.

Figure 4:
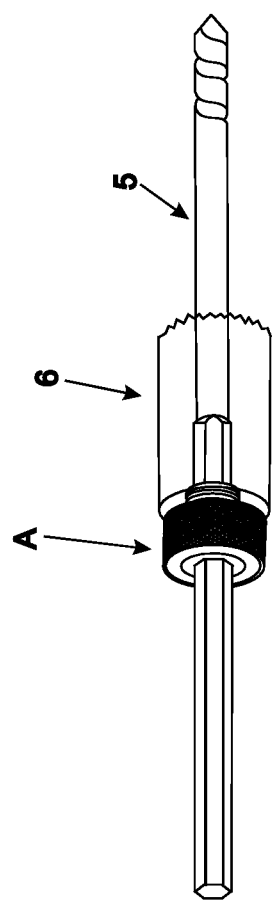
FIG. 4 is a perspective view of an embodiment according to the present invention.

As shown on FIG. 4, the threaded portion 35 of the quick release device A is engaged with the threaded hole 61 of the hole saw 6 and the drill rod 5 is directly slid into and assembled with the quick release device A so as to form the hole saw assembly. The drill rod 5 can be fastened or released by the quick release device A. The drill rod 5 is mounted into the quick release device A so that users can fasten and release the drill rod 5 quickly. The user can quickly assemble the shank 51 on the hole saw 6.

The shank 51 of the drill rod 5 can be slid out of the quick release device A for replacement of a new drill rod 51. Then the shank 51 of the new drill rod 51 is fastened on the hole saw 6 by the quick release device A so that the shank 51 can rotate with the hole saw 6 synchronously.

Figure 5:
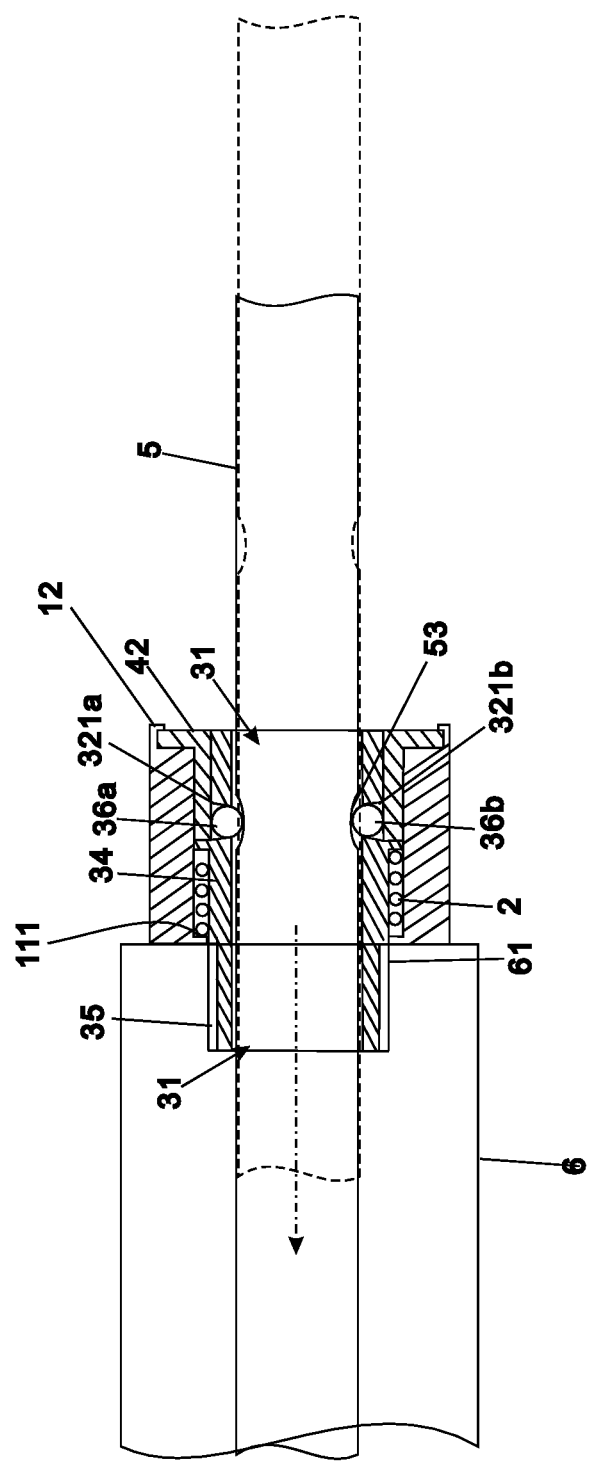
FIG. 5 is a schematic drawing showing an embodiment in use according to the present invention.
Figure 6:
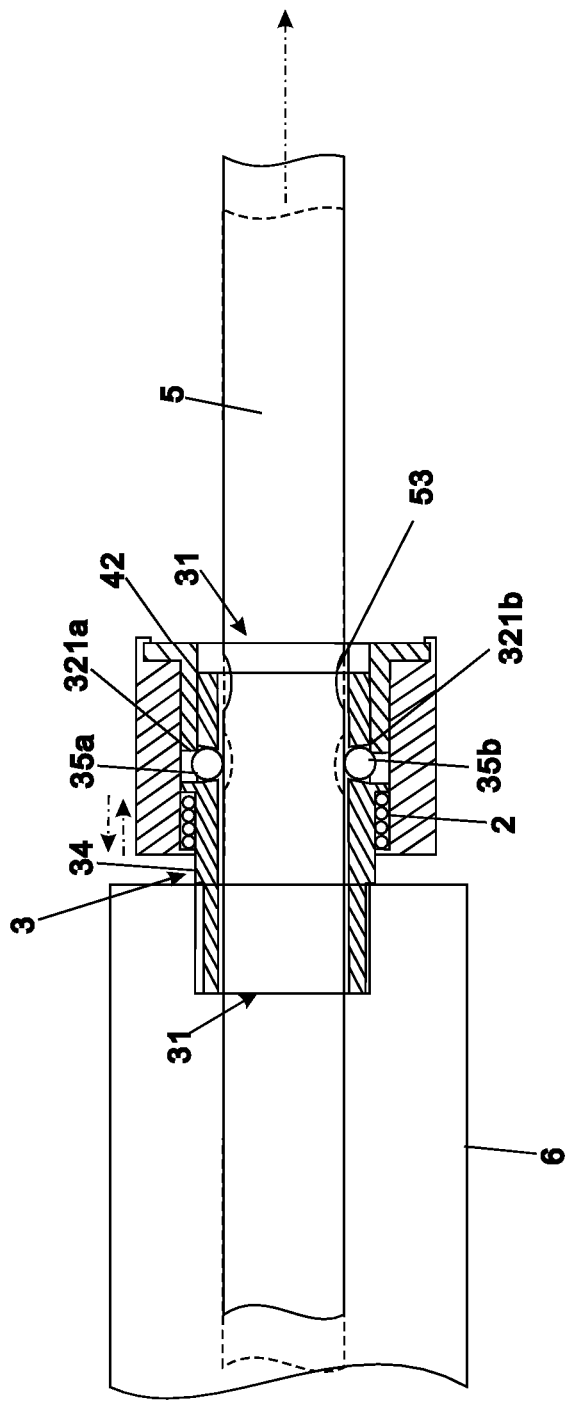
FIG. 6 is another schematic drawing showing an embodiment in use according to the present invention.

As shown in FIG. 5 and FIG. 6, first the threaded portion 35 of the quick release device A is fastened in the threaded hole 61 of the hole saw 6. Then the ring 1 of the quick release device A is axially removed within a certain distance. Thereby the edge of the first connection portion 43 of the sleeve 4 is away from the sockets 321a, 321b. Now the beads 36a, 36b in the sockets 321a, 321b respectively are no more pressed by the first connection portion 43 and are moveable. Then the shank 51 of the drill rod 5 is inserted into the assembly hole 31 of the quick release device A, slid through the threaded portion 35 and penetrated the hole saw 6. The ring 1 is not released until the circular groove 53 of the shank 51 is moved to the position of the sockets 321a, 321b. Next the ring 1 is turned back due to the spring 2. At the same time, the sleeve 4 is also turned back due to the ring 1. Now the inner surface of the first connection portion 43 of the sleeve 4 presses the beads 36a, 36b so that the beads 36a, 36b are stopped and fixed in the sockets 321a, 321b and against the circular groove 53 of the shank 51 respectively. Thereby the shank 51 is locked and fastened in the quick release device A. Refer to FIG. 5, one end of the shank 51 is extended from the quick release device A and is used as a transmission shaft of the hole saw 6 assembly. Moreover, the ring of the quick release device A is moved axially within a certain distance again when the drill rod 5 is quickly slid out of the quick release device A. The edge of the first connection portion 43 of the sleeve 4 is away from the sockets 321a, 321b. As shown in FIG. 6, without being pressed by the first connection portion 43, the beads 36a, 36b in the sockets 321a, 321b respectively are moveable. Thus the circular groove 53 of the shank 51 is no more locked and fastened by the beads 36a, 36b. The shank of the drill rod can be slid out of the quick release device A and released from the hole saw 5. The ring 1 is not released and not turned back until the drill rod 5 is completely released.

The present invention has following advantages:

1. First of all, the drill rod 5 is directly inserted through the quick release device A while the quick release device A is directly assembled with the hole saw 6. The shank 51 of the drill rod 5 is a transmission shaft of the hole saw 6. After being connected to electric tools, the shank 51 is driven to rotate by the electric tools and the drill head 52 is synchronously driven to rotate by the shank 51. Thus offset caused by vibration during high-speed rotation can be avoided.

Secondly, the quick release device A of the present invention with simple structure is directly engaged and integrated with the hole saw 6 to form an integral assembly. Thereby the drill rod 5 can be directly slid into the assembly of the quick release device A with the hole saw 6. Once the user wants to remove the drill rod 5 from the hole saw 6, he only needs to move the ring 1 axially within a certain distance. Thus the drill rod 5 is released from the hole saw 6 quickly.

3. The assembly hole 31 of the drive body 3 is hexagonal. The shape of the assembly hole 31 matches that of the shank 51 of the drive rod 5 so that the shank 51 can be mounted into the assembly hole 31. The hexagonal portion 34 of the drive body 3 is fitted into the hexagonal hole 11a of the ring 1 so that the drill rod 5 can be positioned during the rotation and idle rotation can be avoided. Moreover, the drive body 3 is moved axially, but not radially within the hexagonal hole 11a of the ring 1. In other words, the ring is moved along the drive body 3.

It should be noted that the quick release device A of the present invention is a component of the hole saw 6 and used for quick replacement and fastening of the drill rod 5. The assembly of the present invention is suitable for hole saws whose diameter is no more than 30 mm.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A hole saw assembly with diameter no more than 30 mm, comprising:
    a hole saw having a threaded hole;
    a drill rod, wherein the drill rod comprises a drill head and a shank which is integrally extended from the drill head for being connected to an electric tool, and defining a circular groove at the shank; and
    a quick release device, wherein the quick release device is disposed with the hole saw; wherein the quick release device comprises:
        a ring having a first end and a second end, wherein the first end defines a flange and a mounting hole therein, and the second end defines a stopping part having a hexagonal hole extended from the mounting hole, wherein the mounting hole is a circular hole penetrating the ring;
        a sleeve provided in the mounting hole, wherein the sleeve comprises an extension portion and a first connection portion extended from the extension portion and defines an axial hole extended axially from the extension portion to the first connection portion; and
        a drive body provided in the mounting hole and assembled with the sleeve, wherein the drive body comprises a second connection portion, a stopping portion extended axially from the second connection portion, a hexagonal portion extended axially from the stopping portion, a threaded portion extended axially from the hexagonal portion and at least one bead and defines a hexagonal assembly hole extended axially from the second connection portion to the threaded portion, wherein the second connection portion has at least one socket for receiving the bead therein,
    wherein the threaded portion of the drive body is engaged with the threaded hole of an end surface of the hole saw, wherein the sleeve is movably provided in the mounting hole of the ring, the drill rod is inserted in the hexagonal assembly hole and the bead of the drive body is fastened in the circular groove such that when the second connection portion of the drive body is mounted in the axial hole of the sleeve, the bead of the drive body is driven by the first connection of the sleeve and fastened in the circular groove so as to fasten the drill rod in the hexagonal assembly hole; when the first connection portion of the sleeve is driven to move away from the stopping portion of the drive body, the bead of the drive body is released and the drill rod is capable of sliding out of the hexagonal assembly hole.

2. The hole saw assembly, as recited in claim 1, wherein the extension portion of the sleeve is provided against the edge of the first end of the ring, the flange of the ring is disposed around the outer diameter of the extension portion of the sleeve, and the ring is driven to move axially such that when the ring is driven to move axially away from the hole saw, the ring drives the first connection portion of the sleeve to move away from the stopping portion of the drive body so as to release the bead of the drive body.

3. The hole saw assembly, as recited in claim 2, further comprising a spring, wherein the spring is provided between the stopping part of the ring and the stopping portion of the drive body to enable the ring to be driven and turn back to an original position.

4. The hole saw assembly, as recited in claim 3, wherein the second end of the ring defines a stopping part for stopping the drive body to slide out of the hexagonal hole and an edge of the first connection portion of the sleeve stops the drive body to move by the stopping portion thereof so as to stop the drive body to slide out of the axial hole.

5. The hole saw assembly, as recited in claim 4, wherein one end of the shank of the drill rod is extended from the quick release device such that the shank of the drill rod is used as a transmission shaft of the hole saw and is rotates synchronously with the hole saw.

6. The hole saw assembly, as recited in claim 1, wherein the second end of the ring defines a stopping part for stopping the drive body to slide out of the hexagonal hole and an edge of the first connection portion of the sleeve stops the drive body to move by the stopping portion thereof so as to stop the drive body to slide out of the axial hole.

7. The hole saw assembly, as recited in claim 1, wherein one end of the shank of the drill rod is extended from the quick release device such that the shank of the drill rod is used as a transmission shaft of the hole saw and is rotated synchronously with the hole saw.

8. A hole saw assembly with diameter no more than 30 mm, comprising:
    a hole saw having an opening and an end surface, wherein the diameter of the hole saw is no more than 30 mm, wherein the end surface has a threaded hole;
    a drill rod, wherein the drill rod comprises a drill head and a shank defining a circular groove therein, wherein the shank is a hexagonal prism integrally extended axially from the drill head for being connected to an electric tool; and
    a quick release device, wherein the quick release device is disposed with the hole saw, wherein the quick release device comprises:
        a ring comprising a first end and a second end, wherein the first end defines a flange and a mounting hole therein, and the second end defines a stopping part having a hexagonal hole extended from the mounting hole, wherein the mounting hole is a circular hole penetrating the ring;
        a sleeve provided in the mounting hole, wherein the sleeve comprises an extension portion and a first connection portion extended from the extension portion and defines an axial hole extended axially from the extension portion to the first connection portion; and a drive body provided in the mounting hole and assembled with the sleeve, wherein the drive body comprises a second connection portion, a stopping portion extended axially from the second connection portion, a hexagonal portion extended axially from the stopping portion, a threaded portion extended axially from the hexagonal portion and at least one bead and defines a hexagonal assembly hole extended axially from the second connection portion to the threaded portion, wherein the second connection portion has at least one socket for receiving the bead therein, wherein the threaded portion of the drive body is capable of being engaged with the threaded hole of the end surface of the hole saw, wherein the sleeve is movably provided in the mounting hole of the ring, the drill rod is inserted in the hexagonal assembly hole and the bead of the drive body is fastened in the circular groove such that when the second connection portion of the drive body is mounted in the axial hole of the sleeve, the bead of the drive body is driven by the first connection of the sleeve and fastened in the circular groove so as to fasten the drill rod in the hexagonal assembly hole; when the first connection portion of the sleeve is driven to move away from the stopping portion of the drive body, the bead of the drive body is released and the drill rod is slid out of the hexagonal assembly hole.

9. The hole saw assembly, as recited in claim 8, wherein the extension portion of the sleeve is provided against the edge of the first end of the ring, the flange of the ring is disposed around the outer diameter of the extension portion of the sleeve, and the ring is driven to move axially such that when the ring is driven to move axially away from the hole saw, the ring drives the first connection portion of the sleeve to move away from the stopping portion of the drive body so as to release the bead of the drive body.

10. The hole saw assembly, as recited in claim 9, further comprising a spring, wherein the spring is provided between the stopping part of the ring and the stopping portion of the drive body to enable the ring to be driven and turn back to an original position.

11. The hole saw assembly, as recited in claim 10, wherein the second end of the ring defines a stopping part for stopping the drive body to slide out of the hexagonal hole and an edge of the first connection portion of the sleeve stops the drive body to move via the stopping portion thereof so as to stop the drive body to slide out of the axial hole.

12. The hole saw assembly, as recited in claim 11, wherein one end of the shank of the drill rod is extended from the quick release device such that the shank of the drill rod is used as a transmission shaft of the hole saw and is rotated synchronously with the hole saw.

13. The hole saw assembly, as recited in claim 8, wherein the second end of the ring defines a stopping part for stopping the drive body to slide out of the hexagonal hole and an edge of the first connection portion of the sleeve stops the drive body to move via the stopping portion thereof so as to stop the drive body to slide out of the axial hole.

14. The hole saw assembly, as recited in claim 8, wherein one end of the shank of the drill rod is extended from the quick release device such that the shank of the drill rod is used as a transmission shaft of the hole saw and is rotated synchronously with the hole saw.

15. A quick release device for a hole saw assembly with diameter no more than 30 mm, the hole saw assembly comprises a hole saw having a threaded hole and a drill rod, wherein the drill rod comprises a drill head and a shank, which is integrally extended from the drill head for being connected to an electric tool, and defining a circular groove at the shank, wherein the quick release device, comprises:

a ring having a first end and a second end, wherein the first end defines a flange and a mounting hole therein, and the second end defines a stopping part having a hexagonal hole extended from the mounting hole, wherein the mounting hole is a circular hole penetrating the ring;

a sleeve provided in the mounting hole, wherein the sleeve comprises an extension portion and a first connection portion extended from the extension portion and defines an axial hole extended axially from the extension portion to the first connection portion; and a drive body provided in the mounting hole and assembled with the sleeve, wherein the drive body comprises a second connection portion, a stopping portion extended axially from the second connection portion, a hexagonal portion extended axially from the stopping portion, a threaded portion extended axially from the hexagonal portion and at least one bead and defines a hexagonal assembly hole extended axially from the second connection portion to the threaded portion, wherein the second connection portion has at least one socket for receiving the bead therein, wherein the threaded portion of the drive body is engaged with the threaded hole of an end surface of the hole saw, wherein the sleeve is movably provided in the mounting hole of the ring, the drill rod is inserted in the hexagonal assembly hole and the bead of the drive body is fastened in the circular groove such that when the second connection portion of the drive body is mounted in the axial hole of the sleeve, the bead of the drive body is driven by the first connection of the sleeve and fastened in the circular groove so as to fasten the drill rod in the hexagonal assembly hole; when the first connection portion of the sleeve is driven to move away from the stopping portion of the drive body, the bead of the drive body is released and the drill rod is capable of sliding out of the hexagonal assembly hole.

16. The quick release device, as recited in claim 15, wherein the extension portion of the sleeve is provided against the edge of the first end of the ring, the flange of the ring is disposed around the outer diameter of the extension portion of the sleeve, and the ring is driven to move axially such that when the ring is driven to move axially away from the hole saw, the ring drives the first connection portion of the sleeve to move away from the stopping portion of the drive body so as to release the bead of the drive body.

17. The quick release device, as recited in claim 16, further comprising a spring, wherein the spring is provided between the stopping part of the ring and the stopping portion of the drive body to enable the ring to be driven and turn back to an original position.

18. The quick release device, as recited in claim 17, wherein the second end of the ring defines a stopping part for stopping the drive body to slide out of the hexagonal hole and an edge of the first connection portion of the sleeve stops the drive body to move by the stopping portion thereof so as to stop the drive body to slide out of the axial hole.

19. The quick release device, as recited in claim 15, wherein the second end of the ring defines a stopping part for stopping the drive body to slide out of the hexagonal hole and an edge of the first connection portion of the sleeve stops the drive body to move by the stopping portion thereof so as to stop the drive body to slide out of the axial hole.

20. The quick release device, as recited in claim 15, wherein one end of the shank of the drill rod is extended from the quick release device such that the shank of the drill rod is used as a transmission shaft of the hole saw and is rotated synchronously with the hole saw.

\* \* \* \* \*